United States Patent [19]

McMurtrey

[11] Patent Number: 5,058,317
[45] Date of Patent: Oct. 22, 1991

[54] MULCH COLLAR

[76] Inventor: Lawrence J. McMurtrey, 12122 196th NE., Redmond, Wash. 98053

[21] Appl. No.: 517,573

[22] Filed: May 1, 1990

[51] Int. Cl.⁵ ............................................ A01G 13/02
[52] U.S. Cl. ............................................ 47/25; 47/9; 47/32
[58] Field of Search .................... 47/9, 24, 25, 32, 33, 47/28.1, 28

[56] References Cited

U.S. PATENT DOCUMENTS

| | | |
|---|---|---|
| 1,453,810 | 5/1923 | Sleen ....................................... 47/25 |
| 1,931,602 | 10/1923 | Colman ..................................... 47/25 |
| 2,209,891 | 7/1940 | Hoover . |
| 2,949,698 | 8/1960 | Downey et al. . |
| 3,005,287 | 10/1961 | Dudley . |
| 3,059,378 | 10/1962 | Noras . |
| 3,727,347 | 4/1973 | Barnes . |
| 3,857,195 | 12/1974 | Johnson . |
| 4,539,800 | 9/1985 | Furmaga ............................ 47/9 X |
| 4,794,726 | 1/1989 | Fawcett et al. . |

FOREIGN PATENT DOCUMENTS

| | | |
|---|---|---|
| 1185793 | 4/1985 | Canada ..................... 47/9 |
| 921541 | 2/1954 | Fed. Rep. of Germany .......... 47/28 |
| 2832460 | 2/1980 | Fed. Rep. of Germany .......... 47/32 |
| 3504112 | 9/1986 | Fed. Rep. of Germany ............ 47/9 |
| 588841 | 2/1959 | Italy ........................................ 47/32 |
| 2106936 | 5/1987 | Japan ........................................ 47/9 |
| 45874 | 2/1909 | Switzerland ........................... 47/25 |
| 1284768 | 8/1972 | United Kingdom . |
| 1378663 | 12/1974 | United Kingdom . |
| 1381679 | 1/1975 | United Kingdom . |
| 2053640 | 2/1981 | United Kingdom . |

Primary Examiner—David A. Scherbel
Assistant Examiner—Joanne C. Downs
Attorney, Agent, or Firm—Hughes & Multer, P.S.

[57] ABSTRACT

A mulch collar for installation around a stem of a plant. The mulch collar comprises a web of relatively thin, pliable material having an opening for accommodating the stem of the plant and a slit extending from the opening to a peripheral edge of the web. An elongate flexible member formed into a ring is attached to the web, and has first and second ends adjacent to one another. The ring is attached to the web so that the opening through the web is located within the ring, and so that the first and second edges of the slit meet the ring proximate the first and second ends of the flexible member, respectively, and are thus adjacent to one another. The collar may be installed about a plant by spreading the first and second ends of the flexible member apart so as to form a gap intermediate the first and second edges of the slit, and pulling the collar around the plant so that the stem of the plant passes through the gap and into the opening in the web. The ends of the flexible member are then released so that the ends return to a position adjacent to one another, returning the first and second edges of the slit to the position adjacent to one another so as to close the gap in the web. A portion of the collar may be bent upwardly to form a screen for shading the plant.

18 Claims, 3 Drawing Sheets

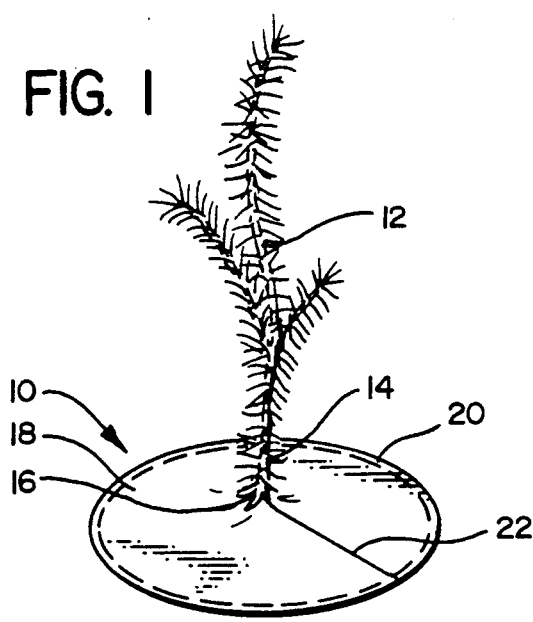
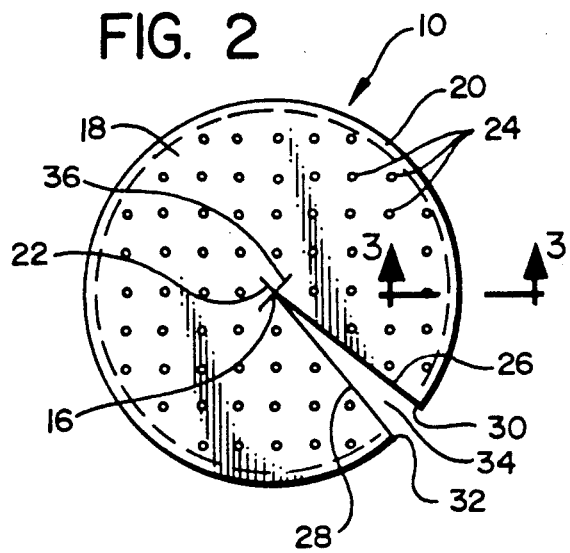
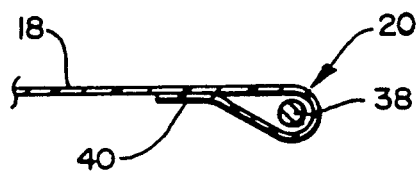
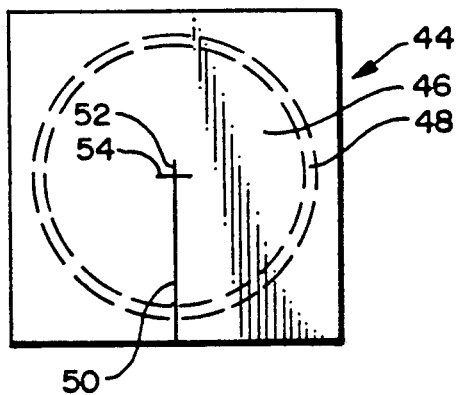
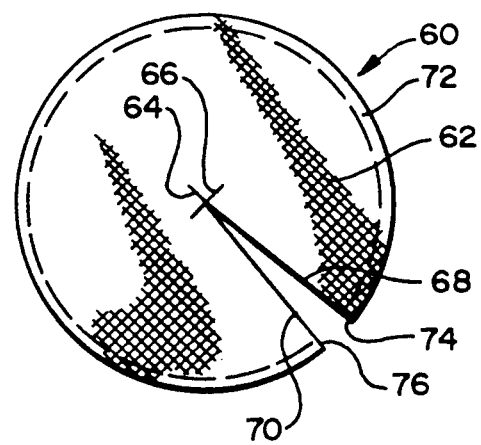
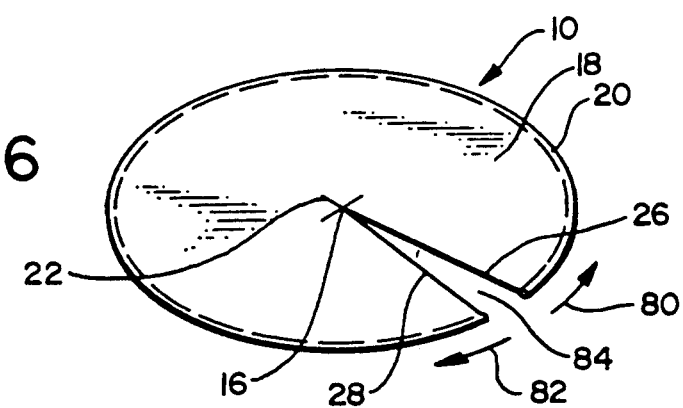

1

MULCH COLLAR

FIELD OF THE INVENTION

This invention relates to ground covers for use in agriculture, and, more specifically, to a mulch to fit around the stems of growing plants to retard weed growth, enhance useful plant growth, conserve moisture, and minimize temperature variations at the roots.

BACKGROUND OF THE INVENTION

Mulch has long been used in agriculture to enhance the growth of plants and to minimize the growth of weeds. Since the earliest times, mulch has taken the form of weeds, grass clippings, chips, and all kinds of biodegradable plant matter. The object is to cover the soil around the stem of the growing plant and over the roots to screen sunlight from the adjacent soil and minimize the growth of weeds. If there is no sunlight, the weeds will not grow. The mulch will typically also allow water from irrigation or rain to percolate through the soil beneath the mulch. The overlying mulch layer will inherently slow the evaporation of water from the soil, and in theory will hold more water near the roots of the plant to increase its growth. The need for such mulch is most pronounced while the plant is young and/or after planting or transplanting, at which time it is most vulnerable to the effects of weeds, which take moisture and nutrients from the soil. Some young plants may also need a degree of protective shade during this vulnerable period, particularly in hot climates.

In this century, various modifications of the age old use of biodegradable vegetable matter as a mulch have been tried with varying success. In general, these variations have taken the form of a variety of mats, collars, and shoes which fit about a plant stem. Some of these devices, in addition to inhibiting the growth of weeds in the vicinity of the plant, have demonstrated other useful functions; for example, some mulches may help keep the soil around the plant moist, by reducing evaporation and encouraging condensation on the underside of the device. Furthermore, in cold weather such mulches may help to keep the roots of the plant at acceptable temperatures by shielding the soil surface from the wind and providing a measure of insulation against ground frost.

Various kinds of artificial mulch are known or have been proposed, the simplest being sheets or strips of opaque plastic film, usually black or green. This is commonly used by strawberry growers around their plants. Such film, however, is very prone to being lifted by the wind, and, since it is subject to being folded and wrinkled, may adversely affect the distribution of moisture to the plant during the watering. Furthermore, it is often desired to grow such plants in gardening pots; artificial mulches consisting of simple sheets of plastic film typically have no convenient means by which they may be anchored in a gardening pot, and thus are easily lifted by the wind or other forces and disarranged.

Another simple type of artificial mulch takes the form of a cardboard sheet having a central opening for receiving the stem of a plant. A slit extending from the opening to an edge of the sheet enables the sheet to be deformed to provide a passage by which the stem may be inserted into the opening. Disadvantages of this type of artificial mulch are its tendency to distort and curl up at the edges, so reducing both its efficiency and its ability to permit a ready supply of moisture to the plant. Furthermore, the slit may cause a gap in the coverage provided by the sheet, thus uncovering a portion of the soil surface which can then be invaded by weeds.

Another kind of artificial mulch that has been proposed consists of a pair of chevron-shaped flexible mats which are placed in opposed relationship on the ground on either side of the stem of the plant so that the stem protrudes through a diamond-shaped opening formed at the apices of the two reentrant sides of the mats. Apart from the placing turf thereon, which represents a slow and labor-intensive process, no means are provided for maintaining the mats in position, and an excessive overlap of the mats is required to complete the installation, wasting a significant amount of mat material.

Yet another type of artificial mulch, described in U.S. Pat. No. 4,794,726 to Fawcett et al. (1989), consists of a mat formed of a woven plastic material having aluminum flakes bonded thereto for reflecting sunlight toward the underside of the leaves on the plant. A slit is provided in the mat, from one edge to the center hole, in order to place the mat around a growing plant. No means are provided for insuring that the gap created by the slit is kept closed. This mat also appears to be relatively expensive, which is a significant disadvantage for use in reforestation projects and the like, where a vast number of individual mulch rings may be used once and left permanently installed about the seedlings or saplings.

A number of other artificial mulches have similar arrangements of central stem openings and radial installation slits which lack means for ensuring that the gaps formed by the slits are kept closed. Such mulches include the following: British Pat. No. 2,053,640 to Mellor (1981) discloses a mulch shoe consisting of a thin, opaque web of stiff material having a central hole and transverse slit for installation. The web has channels for collecting and distributing water. The relatively stiff material of this device also may damage the stem of the plant if it is left installed over an extended period of growth. U.S. Pat. No. 3,857,195 to Johnson (1974) discloses a mulch packet having a water permeable compartment for holding fertilizer and a perforated plastic base through which water is discharged into the soil after percolating through the fertilizer; the central portion of the packet may be punched out to provide an opening for the trunk of a plant, and a radial slit extends from the opening to the periphery of the packet. British Pat. No. 1,378,663 to Basnayake (1974) discloses a mulch ring, having a central aperture and radial slit, which is made of an impervious top sheet underlain by second and third sheets which contain nutrients, fungicides, insecticides, and/or herbicides.

Another mulch ring, described in British Pat. No. 1,381,679 to Williams (1975), consists of a cover having small ventilation holes and a central hole and a slot for installation. The cover is thicker near its outer edge, so as to support the wheels of lawn mowers which may run over it. An overlapping portion closes the installation slot, however, a separate clip is required to secure the overlapped portions together; accordingly, this device requires extra parts and labor which reduce both the economy and speed of installation. British Pat. No. 1,284,768, also to Williams (1972), discloses a substantially similar device which exhibits similar disadvantages.

A number of other artificial mulches similarly require undesirable extra parts, labor, and time to install. Such mulches include the following: U.S. Pat. No. 3,727,347 to Barnes (1973) discloses an artificial grass-like mat which has a central opening which fits around a tree and a radial slit; a staple must be inserted through the mat to fasten it to the ground and to hold the slit closed. U.S. Pat. No. 3,059,378 to Noras (1962) discloses a pad made of semi-dry concrete mix in two or more complementary parts with a central aperture for the accommodation of a tree; staples must be inserted to hold the parts together. It would also be necessary to remove this device following a period of growth in order to accommodate the increased diameter of the trunk.

U.S. Pat. No. 3,005,287 to Dudley (1961) discloses another artificial mulch which requires extra parts and labor to install. This device includes a plastic disc having a central opening and a radial slit; plant food cups are mounted in an annular trough which is provided with drain holes. A depending peripheral flange of the disc is buried in the soil to install the disc, and perforated, flanged tubes are then driven through some of the holes of the trough.

U.S. Pat. No. 2,949,698 to Downey et al. (1960) discloses a mulch device consisting of a relatively thick square pad of resilient fibrous material which has a central opening and a radially extending oblique cut or slot which intersects the pad surfaces at an angle of approximately 45°. The thick pad is flexed apart and fitted around the trunk of a plant, the resilience of the pad causing the sides to spring together until the oblique slot is closed; the cohesion of the fibrous material of the pad enhances the seal thus formed. This arrangement relies on having the pad made out of a relatively thick, and hence expensive, sheet of material.

U.S. Pat. No. 2,209,891 to Hoover (1940) discloses a cage-like structure which is fitted about a plant to support organic mulch (e.g. leaves) above the surface of the ground to promote drainage and air circulation. In one version, the device consists of a relatively complex wire cage constructed in two semi-circular sections having spike portions which can be driven into the earth to secure the halves in position. This device is not itself a mulch ring; rather, it supports organic mulch which is packed on top of it. Furthermore, installation of the device would appear to require extensive manual fitting.

Each of the above described products may have some beneficial effect under certain circumstances. As noted, however, each of the products also has certain deficiencies in terms of expense and efficiency of installation. These disadvantages are magnified in applications, such as reforestation, which call for the use of a very large number of mulch devices, which are preferably left permanently installed about the trees. Furthermore, none of the above described products appears to be able to be securely mounted in the mouth of a planting pot, or to provide shade which may be needed by a young plant. Accordingly, what is needed is an inexpensive artificial mulch device which can be quickly installed with a minimum of labor and parts, and which can be left permanently installed about the plant as it grows. Furthermore, there is needed such a mulch device which can be mounted in the mouth of a planting pot so as to remain secured therein against the wind and other forces, as well as for a mulch device which can provide protective shade where desirable.

SUMMARY OF THE INVENTION

This invention has solved the problems cited above, and the invention comprises, in a broad sense, a web of relatively thin, pliable material having an opening therethrough for accommodating the stem of the plant, a slit extending from the central opening to a peripheral edge of the web, and an elongate flexible member formed in a ring and bonded to the web. The flexible member has a first end which overlaps its second end, and is bonded to the web so that (a) the central opening through the web is located within the ring, and (b) the first edge of the slit meets the ring proximate the first end of the flexible member, while the second edge of the slit meets the ring proximate the second end of the flexible member, so that the first and second edges of the slit overlap one another.

The web may be made of a sheet of substantially opaque plastic, or may be made of a woven and/or a biodegradable material.

The elongate flexible member may be a plastic rod or a metal wire. The ring formed by the flexible member may be of sufficient weight to hold the collar in place against a predetermined wind force when installed around a plant stem. A protruding end of the flexible member may be bent down so as to form a spike for securing the collar to the ground.

In some embodiments, the ring may have a diameter slightly greater than the diameter of a mouth of a gardening pot of a predetermined size, so that the ring is compressed and engages the mouth of the pot when mounted therein.

In other embodiments, the collar may be oval and have an upwardly bent portion for shading the plant.

One of the benefits of the mulch collar described is that the material of the web at the edges of the slit automatically overlaps so as to close the gap formed thereby without the need for additional manipulation or additional fastening pieces. Another benefit of the present invention is that the relatively thin, pliable material of the web at the center of the collar will give way as the trunk of the plant grows and increases in diameter, so that the collar can be left permanently installed about the plant without fear of damaging the trunk. Another advantage of the collar of the present invention is that the weight of the ring may anchor the collar in place against the forces of the wind as may the downwardly bent spike. Yet another advantage of the present invention is that the flexible ring may engage the mouth of a planting pot so as to securely mount the collar therein. Another advantage is that a collar according to the present invention may be used to provide protective shade for a plant.

These and other advantages of the invention not clear from the above will be understood by reading of the following detailed description of the invention and a review of the drawings.

BRIEF DESCRIPTION OF THE DRAWINGS

FIG. 1 is a perspective view of a mulch collar according to the invention surrounding a growing plant;

FIG. 2 is a plan view of a mulch collar according to the invention wherein the web is a plastic sheet having a plurality of perforations for the passage of air and water therethrough;

FIG. 3 is a sectional view of the mulch collar of FIG. 2, taken along line 3—3, showing the attachment of the web to the flexible member of the ring;

FIG. 4 plan view of a mulch collar according to another embodiment of the invention, having a rectangular web;

FIG. 5 is a plan view of a portion of a mulch collar according to another embodiment of the present invention, having a web formed of a woven material;

FIG. 6 is a perspective view of a mulch collar according to the present invention, having the radial slit therein opened for placement of the collar about a plant;

DETAILED DESCRIPTION OF THE INVENTION

Figure 7:
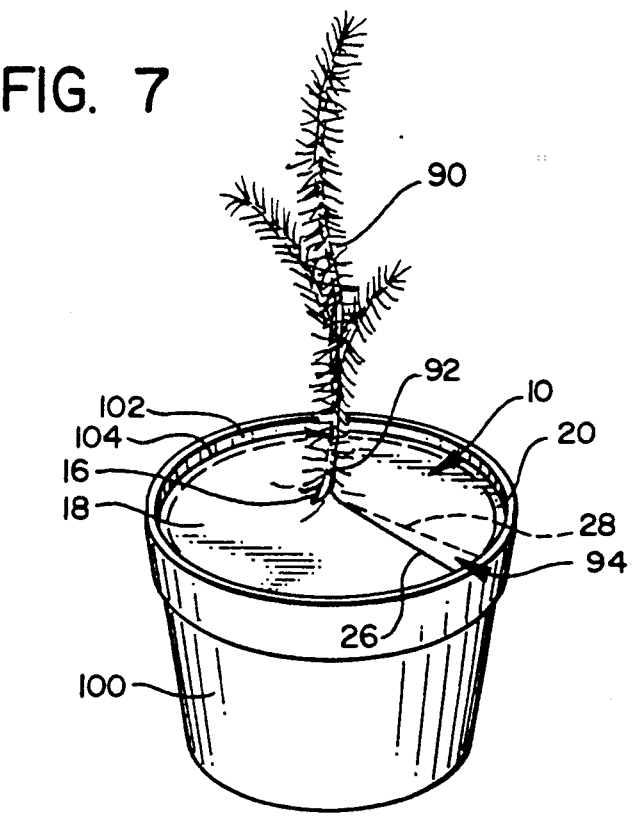
FIG. 7 is a perspective view of the mulch collar of FIG. 6, installed about the stem of a plant in a planting pot, and having the material of the edges of the radial slit overlapped.

FIG. 1 shows a mulch collar 10 positioned about the trunk of a plant 12, and resting on a supporting base, which may be the surface of the ground, from which plant 12 is growing. The trunk, stalk, or stem 14 of plant 12 projects through central opening 16 in web 18 of collar 10. Web 18 is attached to a flexible ring 20, as will be described below, and has a radial slit 22 which extends between central opening 16 and the periphery of collar 10 to provide access by which collar 10 can be installed about stem 14. Mulch collar 10 will typically be installed about plant 12 when it has grown to the point where it has formed a seedling, sapling, or other immature form. As will also be discussed below, the material of web 18 at either edge of slit 22 is overlapped so as to seal the gap formed by the slit.

In the embodiment of the mulch collar which is shown in FIG. 2, web 18 comprises a sheet of thin, pliable plastic. Inasmuch as a purpose of the mulch ring is to prevent light from reaching the ground, the plastic of web 18 is preferably opaque. Furthermore, the opaque plastic material may preferably be dark in color, such as dark green or black, so that the plastic absorbs sunlight which is projected onto it and warms the underlying ground in the vicinity of the roots of the plant.

Plastic web 18 is preferably provided with a multiplicity of perforations 24, through which water and air may pass. Rain water falling on the upper surface of web 18 may thus drain through perforations 24 so as to reach the soil beneath mulch collar 10, from which soil the roots of the plant draw moisture. Since the mulch collar of the present invention spreads web 18 evenly about central opening 16, folding and wrinkling of plastic web 18 is largely avoided and uniform distribution of moisture to the plant through perforations 24 is achieved during watering.

Web 18 is cut by slit 22 which extends from central opening 16 to the periphery of mulch collar 10 at flexible ring 20. Slit 22 consequently forms first and second opposing edges 26 and 28. Flexible ring 20 is split, and first edge 26 of slit 22 meets ring 20 proximate first end 30 of ring 20, while second edge 28 of slit 22 meets ring 20 proximate second end 32 of ring 20. First and second ends 30 and 32 of ring 20 normally overlap one another; flexible ring 20 may be formed so that its ends overlap without a preload and without tensioning web 18, or may be attached to web 18 so that the tension of the web preloads flexible ring 20 with its ends overlapped. Since first and second edges 26 and 28 of slit 22 are attached to ring 20 proximate the first and second ends thereof, first and second edges 26 and 28 also normally overlap one another when flexible ring 20 is in its normal, undeflected condition.

When it is desired to install mulch collar 10 about a plant, an operator simply deflects flexible ring 20 by pulling ends 30 and 32 apart, so as to form a gap 34 between edges 26 and 28 of slit 22. Gap 34 extends from the periphery of mulch collar 10 to central opening 16. Central opening 16 may be a circular perforation of a suitable diameter, or, as shown in FIG. 2, may be formed by intersecting slit 22 in web 18 with a second slit 36, preferably at approximately right angles thereto. Intersecting slits 22 and 36 thus form four flaps in the thin pliable material of web 18. The flaps will bend and give way so as to accommodate the stem of the plant when it is positioned at central opening 16; stems of various diameters may thus be accommodated. Furthermore, as the plant grows, and the stem increases in diameter, the flaps will continue to bend back and give way, and may tear or rip outwardly so as to provide additional room for the growing stem, while avoiding damage to the plant. When initially installed, however, it is desirable that the flexibility of the flaps be sufficient to provide an opening 16 which readily accommodates the existing stem of the plant. Although while the central opening in the web is easily and effectively formed in the just-described manner by intersecting two slits, this opening can be formed in any other suitable manner; for example, the opening can be formed by punching a hole of a desired diameter through the middle of the web.

Once the mulch collar has been placed about the plant so that the stem is located at central opening 16, the operator simply releases ends 30 and 32 of flexible ring 20. The ends 30 and 32 of flexible ring 20 then spring closed and overlap one another, so as to surround central opening 16 and plant stem 14. When released ends 30 and 32 overlap one another, first and second edges 26 and 28 of slit 22 also overlap each other, thus sealing gap 34. Web 18 of installed mulch collar 10 thus completely surrounds the stem of the plant so as to inhibit any weed growth on the ground adjacent thereto.

FIG. 3 shows the flexible ring 20 having thin, pliable web 18 attached thereto. Flexible ring 20 may be circular, as shown, or may have any other suitable shape which surrounds the central opening; for example; the flexible ring may have an elliptical or oval shape, as will be discussed below. Flexible ring 20 comprises an elongate flexible member 38, which is formed into a ring shape, and which has first and second ends as shown in FIG. 2. Flexible member 38 is attached to web 18; in the embodiment illustrated in FIG. 3, circumferential flap 40 of web 18 is bent under flexible member 38 and bonded to the underside of web 18. Flap 40 may be bonded to web 18 by any suitable means known to those skilled in the art, such as, for example, by thermal welding, stitching, glueing, or the like. The bond between flap 40 and web 18 should be sufficiently strong to withstand the stretching of the collar by an operator, and, in embodiments in which the collar is assembled with a radial preload, will need to be strong enough to resist the tension applied by flexible member 38. In some embodiments, it may be desirable to bond flexible member 38 directly to web 18, with or without the use of an enclosing flap 40.

Elongate flexible member 38 may be fabricated of any suitable flexible material, including, for example, flexible plastic rod, metal wire such as spring steel wire, or the like. In the event that the flexible ring 20 is deflected outwardly or inwardly (i.e., the ring is stretched outwardly or compressed inwardly), flexible member 38 will tend to return to its original position when released, thus insuring that the edges of the slit are overlapped. In general, flexible member 38, and hence flexible ring 20, will be heavier than the remaining portion of collar 10 formed by web 18. Elongate flexible member 38 may be made sufficiently heavy so as to anchor collar 10 on the surface of the ground and hold it in position against the wind and other forces.

FIG. 4 shows another embodiment of mulch collar according to the present invention. Mulch collar 44 is shown comprising a web 46, a flexible ring 48 having overlapping ends, a radial slit 50 extending from the periphery of the collar to the central area thereof within ring 48, and a central opening 52 formed by the junction of slit 50 with a second slit 54. Mulch collar 44 is, accordingly, substantially similar to that previously described, with the exception that web 46 is substantially rectangular and extends beyond the edges of flexible ring 48. This arrangement may be desirable if it is desired for mulch collar 44 to cover additional ground beyond that which is encircled by ring 48, or if it is desired to fit mulch collar 44 into a rectangular pattern. A rectangular pattern may occur when a number of plants are planted adjacent to one another in perpendicular rows and columns, or may occur if the plant is planted in a rectangular pot; the rectangular shape of web 46 makes it possible to cover substantially all of the surface of the earth within such a pattern. The portion of the mulch collar which extends beyond the flexible ring may be trimmed or otherwise formed in any other desired shape which may be needed to cover a particular area; for example, the outer edges of web 46 may be shaped to cover triangular or hexagonal areas of ground.

FIG. 5 shows a portion of a mulch collar 60, according to an embodiment of the present invention in which the web 62 is formed of a woven material. In the manner described above, web 62 is provided with a slit 64 which extends from the center of web 62 to the periphery of collar 60. A central opening is formed by the intersection of second slit 66 with first slit 64. First slit 64 has first and second edges 68 and 70, which meet flexible ring 72 proximate first and second ends 74 and 76 thereof, respectively. As was described above, first and second ends 74 and 76 of flexible ring 72 overlap one another when flexible ring 72 is in its normal, undeflected condition, thereby insuring that the gap between edges 68 and 70 is sealed.

The material of web 62 may be a suitable woven fabric of plastic fibers, or may be another woven material, such as porous woven ground cloth, fiberglass cloth, woven recycled cloth or paper, or the like. The woven material of web 62 provides mulch collar 60 with the advantages of providing very even distribution of water to, and ventilation of, the ground beneath the collar without the need for perforating the material, while still preventing light from reaching the ground. It may be especially desirable that the woven material be biodegradable, so that it deteriorates after a desired period following installation.

FIG. 6 shows the installation of mulch collar 10 about a plant. As noted above, in order to install mulch collar 10 an operator simply grasps flexible ring 20, with one hand on either side of slit 22, and flexes ring 20 outwardly so that the ends thereof which are adjacent to slit 22 move away from each other in the directions indicated by first and second arrows 80 and 82 to form gap 84. Gap 84 permits entrance of the plant stem through the periphery of collar 10 and into central opening 16; once the operator has spread the ends of flexible ring 20 apart so as to form gap 84, he simply slips mulch collar 10 about the trunk of the plant and releases it. Once released, the ends of the flexible ring will, without further manipulation, return to their original, overlapped positions, and the first and second edges 26 and 28 of web 18 will overlap one another, thereby sealing gap 84.

FIG. 7 shows the mulch collar installed about a plant 90 in a planting pot 100. In the manner described above, collar 10 is slid over plant 90 and released so that first edge 26 and second edge 28 move angularly past each other and form an overlapped flap portion 94. Overlapped flap portion 94 effectively seals any gap which would otherwise exist between first and second edges 26 and 28, so as to insure effective and uniform coverage of web 18 completely about stem 92.

Planting pot 100 shown in FIG. 7 may be a typical terra-cotta, clay, or plastic pot, or the like, and has a circular mouth 102 having a predetermined inside diameter. It will be observed that the outermost edge 104 of mulch collar 10 is adjacent to, and preferably in contact with, the inside of mouth 102 of pot 100. Thus installed, mulch collar 10 provides protection over the entire surface of the soil contained in pot 100. Mulch collar 10 may consequently be formed so that flexible ring 20 has an outside diameter which is substantially equal to, or just slightly less than, the inside diameter of mouth 102. This arrangement would permit very easy installation of the collars about the potted plants; installation of a collar having slightly smaller diameter than the mouth of the pot would be particularly easy, since it would allow the collar to be slightly off-centered within the mouth and thereby accommodate stems which were themselves off-centered in the pot.

In another embodiment, however, it may be desirable to form mulch collar 10 so that flexible ring 20 has an undeflected outside diameter which is somewhat greater than the inside diameter of mouth 102 of pot 100. In this version, flexible ring 20 would be slightly compressed when installed within mouth 102, so that flexible ring 20 would force outermost edge 104 of mulch collar 10 against the inside of mouth 102; thus installed, edge 104 of collar 10 would frictionally grip the inside of mouth 102, providing additional resistance to dislodgment. This arrangement may be particularly desirable when the installed collars may be subject to relatively high wind forces, or when the pots will be subject to handling and/or shipment. In order to enhance the frictional grip of outermost edge 104 against the inside of mouth 102, outermost edge 104 of collar 10 may be roughened, rubberized, or the like.

Figure 8:
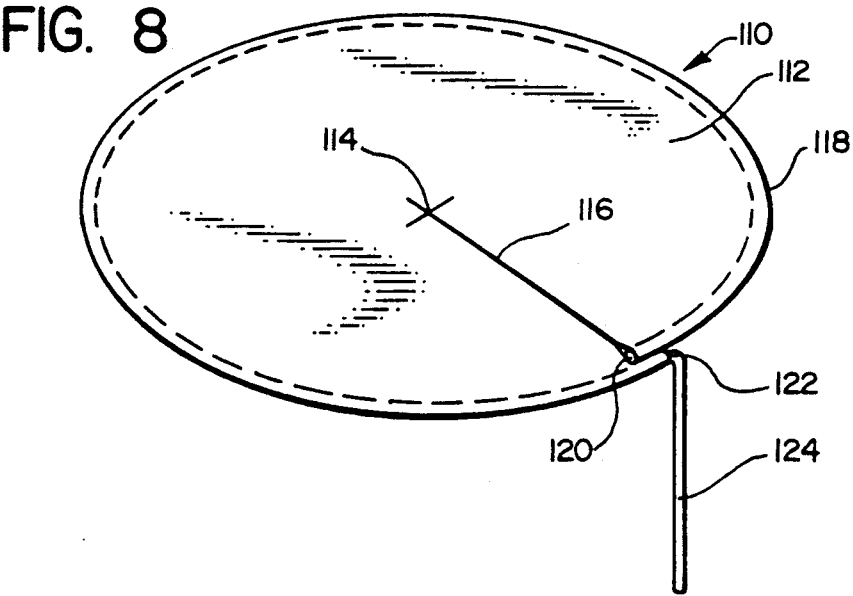
FIG. 8 is a perspective view of a mulch collar according to another embodiment of the present invention, having a protruding end of the flexible member bent downwardly to form a spike.

FIG. 8 shows another mulch ring 110 which is generally similar to the above described embodiments in that it includes a web 112 having a central opening 114 and a slit 116 extending to a flexible ring formed at periphery 118 by flexible member 120, which is attached to web 112 so that the edges of slit 116 overlap one another. In the embodiment illustrated in FIG. 8, however, a portion of flexible member 120 extends or protrudes outwardly from one edge 122 of slit 116, and is bent downwardly to form a spike 124. Spike 124 may be driven into the ground when installing mulch collar 110, so as to provide additional resistance to dislodgement by wind or other forces. A spike 124 having a length of about two to three inches has been found to be eminently suitable, and may easily be installed by simply pressing or stepping on the upper end thereof. The end of the flexible member which does not have a spike formed thereon is free to move above and past the first end (and the edge of the web associated therewith) so as to cause the edges of the slit to overlap when the collar is secured to the ground.

Figure 9:
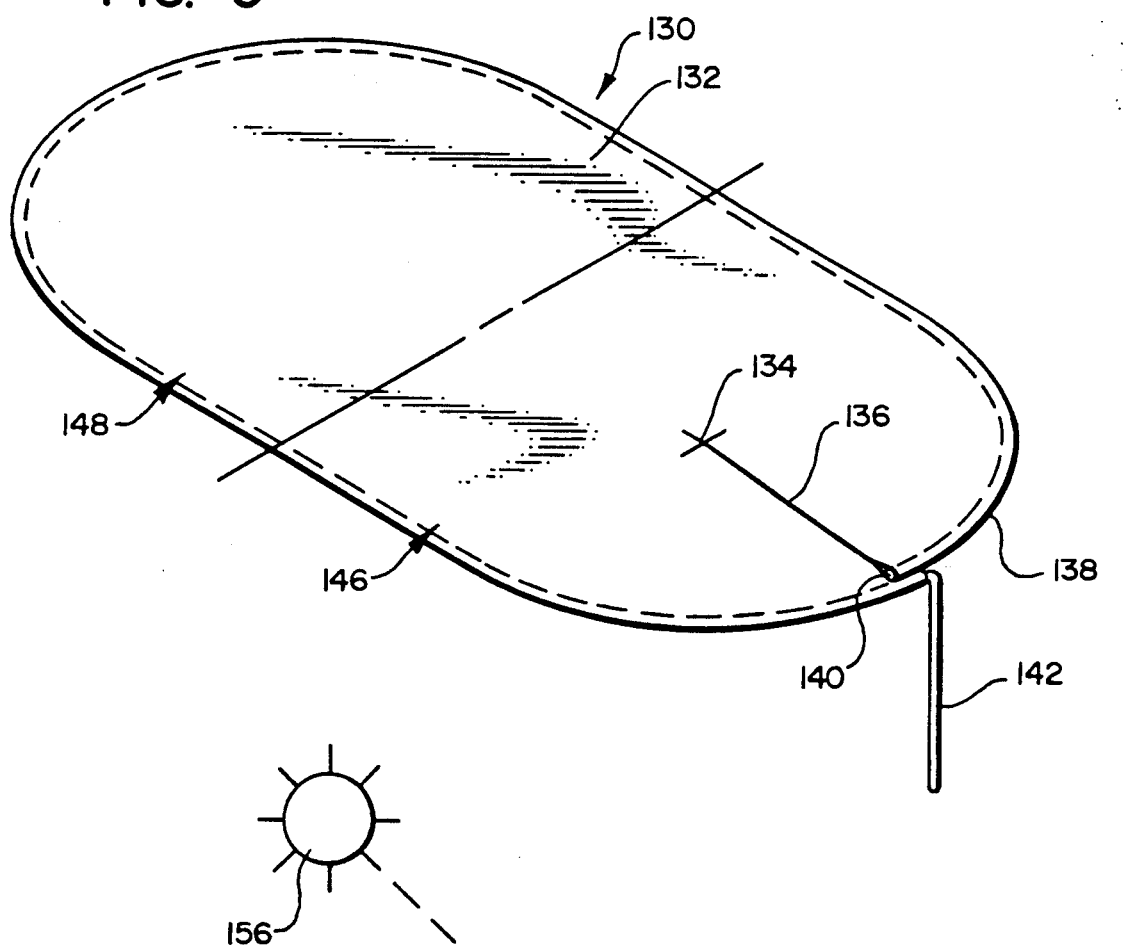
FIG. 9 is a perspective view of a mulch collar according to another embodiment of the present invention, having an oval web and flexible member, so that a portion of the collar may be bent upwardly to provide shade for the plant.

FIG. 9 shows still another mulch collar 130 which is generally similar to the above described embodiments in that it also has a web 132 having an opening 134 therethrough and a slit 136 which extends from the opening to a flexible ring 138 at the periphery of the collar formed by flexible member 140. One end flexible member 140 protrudes from an edge of slit 136 and is bent downwardly to form a spike 142.

In the particular embodiment illustrated in FIG. 9, collar 130 has a generally oval or eliptical shape. Oval collar 130 may be considered as being generally divided into first and second halves by a laterally extending center line 144. Opening 134 is generally centered in a first half 146 of collar 130, while the other half 148 may be bent upwardly to form a sun shade for the plant. An oval or eliptical collar 130 having dimensions of about one foot by two feet has been found eminently suitable.

Figure 10:
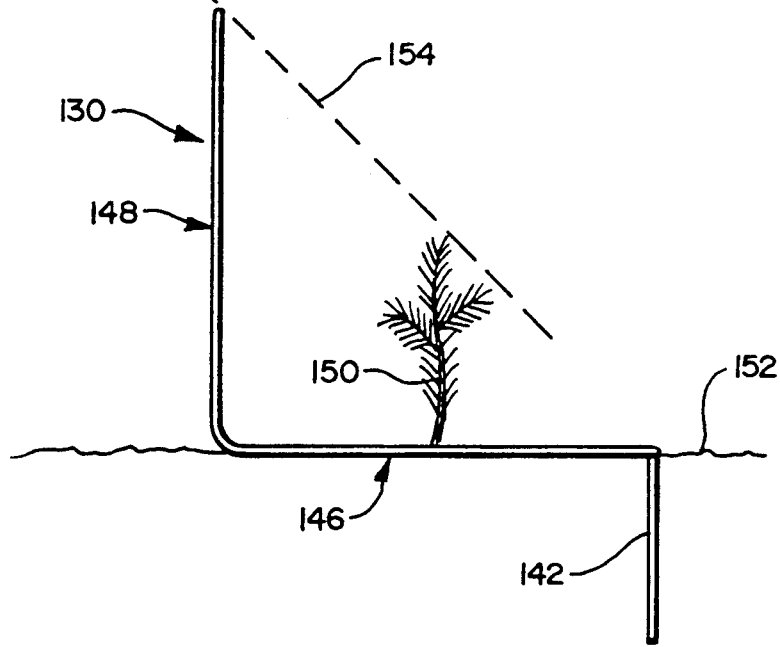
FIG. 10 is a side view of the mulch collar of FIG. 9, showing the installation thereof with an upwardly bent portion providing protective shade for the plant.

FIG. 10 shows the collar 130 of FIG. 9 installed about a plant 150 so as to provide protective shade therefor. First half 146 of collar 150 lies generally flat on the surface of the ground 152, and has opening 134 centered therein, in which plant 150 is positioned. The other half 148 of collar 130 is bent upwardly to form a sun shade or screen for plant 150, and extends generally vertically from the surface of the ground 152. the upwardly extending half 148 of collar 130 consequently shades plant 150 from the rays 154 of the sun 156 once the sun has passed beyond the zenith by a predetermined angle. In many hot climates, this shade protection is particularly important in the afternoon; accordingly, shade half 148 of collar 130 may most preferably be positioned on the southwest side of plant 150, when installed in northern latitudes.

Spike 142 penetrates downwardly into the surface of the ground 152, so as to provide additional anchoring forces with which to secure collar 130 against wind forces acting against upwardly extending sun shade portion 148.

Having described the invention in its preferred embodiments, it will be clear that modifications can be made without departing from the spirit of the invention. It is not intended that the words used to describe the invention nor the drawings illustrating the same be limiting on thee invention. Rather, it is intended that the invention only be limited by the scope of the appended claims.

What is claimed and desired to be secured by Letters Patent of the United States is:

1. A mulch collar for installation around a stem of a plant, said collar comprising:

a thin, pliable web having an opening therethrough for accommodating said stem of said plant and a slit having first and second edges therethrough extending from said opening to a peripheral edge of said web for providing a gap to receive said stem of said plant, said pliable web having insufficient elasticity to return the edges of said slit to positions adjacent one another to close said gap after said edges have been moved apart from one another to open said gap; and an elongate resilient member formed into a ring and having first and second ends adjacent to one another, said ring being attached to said web with said opening through said web located within said ring, and with said first edge of said slit meeting said ring proximate said first end of said resilient member and said second edge of said slit meeting said ring proximate said second end of said resilient member, so that said resilient member biases said edges of said slit from a first position in which said ends of said resilient member are spread apart from one another to selectively open said gap to a second position in which said first and second edges of said slit are adjacent to one another so as to close said gap.

2. The mulch collar of claim 1, wherein said web is a sheet of substantially opaque plastic.

3. The mulch collar of claim 2, wherein said sheet of plastic is provided with a plurality of perforations for permitting the passage of water therethrough.

4. The mulch collar of claim 1, wherein said web is a sheet of permeable woven material.

5. The mulch collar of claim 1, wherein said web is a sheet of biodegradable material.

6. The mulch collar of claim 1, wherein said elongate resilient member is a plastic rod.

7. The mulch collar of claim 1, wherein said elongate resilient member is a metal wire.

8. The mulch collar of claim 7, wherein said ring is of sufficient weight to hold said collar in place against a predetermined wind force when installed around a said plant stem.

9. The mulch collar of claim 7, wherein one said end of said metal wire protrudes outwardly from a said edge of said slit and is bent downwardly so as to form a spike for penetrating the surface of the ground so as to secure said collar thereto.

10. The mulch collar of claim 7, wherein said ring is substantially oblong in shape and has said opening substantially centered within a first half thereof, the second half of said oblong ring being bent upwardly from said first half so that, in response to positioning of said mulch collar about a said plant, said web attached to said first half of said ring extends generally parallel to a ground surface about said plant and said web attached to said second half of said ring extends upwardly from said ground to form a screen for shading said plant from sunlight form a first predetermined direction, but for permitting sunlight to reach said plant from a second predetermined direction.

11. The mulch collar of claim 10, wherein said upwardly bent second half of said ring is configured so that said portion of said web attached to said second half of said ring extends substantially perpendicularly from said ground.

12. The mulch collar of claim 1, wherein said ring is attached to said web so that said resilient member tensions said web outwardly from said opening therethrough.

13. The mulch collar of claim 1, wherein said ring forms a perimeter of said collar.

14. The mulch collar of claim 13 wherein said ring has a diameter approximately equal to an inside diameter of a mouth of a gardening pot of a predetermined size, so that when said mulch collar is positioned about a stem of a plant in said pot, said collar covers substantially the entire surface of soil in said pot about said plant.

15. The mulch collar of claim 13, wherein said ring has a diameter slightly greater than an inside diameter of a mouth of a gardening pot of a predetermined size, so that when said mulch collar is positioned about a stem of a plant in said pot, said collar covers substantially the entire surface of soil in said pot about said plant, and said resilient member biases said perimeter of said collar into frictional engagement with said mouth of said pot so as to prevent dislodgement of said mulch collar.

16. The mulch collar of claim 15, further comprising a portion of said perimeter of said collar having a relatively high coefficient of friction so as to enhance said frictional engagement of said collar with said mouth of said pot.

17. The mulch collar of claim 1, wherein said edges of said slit overlap one another in said second position to which said edges of said slit are biased by said resilient member so that said gap is effectively sealed by said overlapped edges.

18. A method for minimizing weed growth around a plant having a stem, said method comprising:

providing a collar having:
  a web of thin, pliable material, said web having an opening formed therethrough for accommodating said stem of said plant, and a slit having first and second edges formed therethrough extending from sai opening to a peripheral edge of said web for providing a gap to receive said stem of said plant, said pliable web having insufficient elasticity to return the edges of said slit to positions adjacent one another to close said gap after said edges have been moved apart from one another to open said gap; and
  an elongate resilient member formed into a ring having first and second ends adjacent to one another, said resilient member having said web attached thereto with said opening through said web located within said ring, and with said first edge of said slit meeting said ring proximate said first end of said resilient member and said second edge of said slit meeting said ring proximate said second end of said resilient member, so that said first and second edges of said slit are adjacent to one another so as to close said gap;
spreading said first and second ends of said resilient member apart so as to form said gap intermediate said first and second edges of said slit;
pulling said collar around said plant so that said stem of said plant passes through said gap into said opening through said web; and
releasing said first and second ends of said resilient member so that said first and second ends return to a position adjacent to one another, whereby said first and second edges of said slit also return a position adjacent to one another so as to close said gap in said web about said stem of said plant.

* * * * *